United States Patent [19]

Ishibashi et al.

[11] Patent Number: 4,508,786
[45] Date of Patent: Apr. 2, 1985

[54] POLYOLEFIN RESIN COMPOSITION

[75] Inventors: Tadao Ishibashi; Youichi Kugimiya, both of Ichiharashi, Japan

[73] Assignee: Chisso Corporation, Osaka, Japan

[21] Appl. No.: 625,951

[22] Filed: Jun. 29, 1984

Related U.S. Application Data

[62] Division of Ser. No. 520,171, Aug. 4, 1983, Pat. No. 4,487,871.

[30] Foreign Application Priority Data

Aug. 5, 1982 [JP] Japan ............... 57-136660

[51] Int. Cl.$^3$ ................ B32B 5/00; C23C 15/00
[52] U.S. Cl. ................ 428/461; 427/250; 427/296; 428/912.2
[58] Field of Search ........... 427/250, 296; 428/461, 428/912.2

[56] References Cited

U.S. PATENT DOCUMENTS

| 4,005,238 | 1/1977 | Gaehde et al. | 427/250 |
| 4,248,687 | 2/1981 | Fan | 428/912.2 |
| 4,364,792 | 12/1982 | Gliem et al. | 427/250 |
| 4,407,871 | 10/1983 | Eisfeller | 427/250 |

OTHER PUBLICATIONS

Derwent Abstract 39063c/22, (JS 5052333) 4/80.
Derwent Abstract 82215w/50, (JS 0061469) 5/75.

Primary Examiner—Allan M. Lieberman
Attorney, Agent, or Firm—Fred Philpitt

[57] ABSTRACT

A polyolefin resin composition for metallized films, having superior high-impact properties and heat-sealability and also superior printability and adhesive properties of metallized surface and further a good taken-up figure of rolled film is provided, which composition is obtained by blending a crystalline propylene-α-olefin copolymer containing 70% by weight or more of propylene component and having a crystalline m.p. of 150° C. or lower, with a high density polyethylene having a density of 0.940 g/cm$^3$ or higher, in blending ratios of 96 to 80% by weight of the copolymer and 4 to 20% by weight of the polyethylene, the ratio of the melt flow rate of the polyethylene to that of the copolymer being $\geq 0.7$.

2 Claims, No Drawings

POLYOLEFIN RESIN COMPOSITION

This is a division of application Ser. No. 520,171, filed Aug. 4, 1983, now U.S. Pat. No. 4,487,871.

BACKGROUND OF THE INVENTION

1. Field of the Invention

This invention relates to a polyolefin resin composition for metallized films. More particularly, it relates to a polyolefin resin composition for metallized films, which is superior in high-impact properties, easy heat-sealability as well as adhesive properties of metallized membrane and printability onto metallized surface and does not cause inferior taken-up figures such as "wrinkles", "take-up protuberance", etc. in taken-up films at the time of film making as well as at the time of metallizing processing.

In recent years, crystalline propylene-α-olefin copolymers composed mainly of propylene such as ethylene-propylene random copolymer, ethylenepropylene-butene-1 copolymer, propylene-butene-1 copolymer, etc. have been widely used for film use applications, mainly for general packaging films, laminates, etc., utilizing their characteristics such as superior transparency, high-impact properties, heat-sealability, etc. On the other hand, metallized films obtained by depositing metals onto plastic films in vacuo have been widely used for metallized yarns, architectural materials, packaging films, etc., utilizing their superior decorative properties, gas barrier properties, light-shielding properties, etc.

Particularly, aluminum-metallized film has been used in a large amount centering around packaging use applications, but those obtained by metallizing conventional, commercially available propylene-α-olefin copolymer films are weak in the adhesive force between the base film and metallized membrane, and extremely low in the printability and adhesive properties onto the metallized surface; hence it has been impossible to use them for use applications where printing, laminate, etc. have been required, and this has constituted a serious obstacle to their use development. Japanese patent application laid-open No. Sho 55-52333/1980 discloses that the cause of these difficulties consists in that a portion of hydrochloric acid-catching agents, slip agents, antioxidants or the like added into polypropylene film migrates or is transferred to the metallized surface to thereby deteriorate printability and adhesive properties. The present inventors have further investigated the cause of the deterioration of printability and adhesive properties in more detail, and as a result have found that fatty acid derivatives such as higher fatty acid salts, fatty acid amides, fatty acid esters, fatty acid amine derivatives have a worst influence, and that a part of waxes or antioxidants of a low molecular weight which are liable, to migrate or volatilize, also cause similar difficulties; hence usable additives have been extremely restricted.

Particularly, fatty acid derivatives such as higher fatty acid salts e.g. calcium stearate, sodium stearate, etc. used for neutralizing the acidic component of catalyst residue contained in polymers, higher fatty acid amides e.g. oleic amide, stearic amide, erucic amide, ethylenebisstearamide, etc. conventionally used as slip agents for films, even when added in a slightest amount of about 0.01% by weight, cause the wetting index to lower down to 33 dyn/cm or less and also make printing or adhesion onto the metallized surface impossible.

However, these additives have so far been conventionally used as indispensable additives for polypropylene film, and polypropylene containing no such additives raises various problems at the time of film making or film post-processing. For example, unless the above-mentioned slip agents are added, slip characteristics or anti-block properties of films are extremely reduced, and taken-up films have wrinkles or a local enlargement of film roll i.e. the so-called take-up protuberance is formed, whereby productivity is reduced to a large extent. Particularly in the case of propylene-α-olefin random copolymers, these phenomena notably appear due to their low rigidity and great adhesive properties. This not only reduces the productivity and yield of films, but also, even if only portions free from wrinkles or take-up protuberances are selected and subjected to metallizing, wrinkles or protuberances are formed during the take-up step after the metallizing, whereby the productivity has been reduced. The lower the melting points of propylene-α-olefin copolymers, the more notable the phenomena. Further, the more the width of the films are broadened or the more the thickness of the films are reduced, the more notable the phenomena. This applies to films prepared by blending a grafted polypropylene obtained by graft-polymerizing anhydrous maleic acid or the like onto polypropylene (see Japanese patent application laid-open Nos. Sho 50-61469/1975 and Sho 55-52333/1980). Thus, such phenomena have constituted a serious obstacle to production of a metallized polypropylene film which has superior high-impact properties and heat-sealability as well as superior printability and adhesive properties of the metallized surface.

The present inventors have made various studies of a process for producing a metallized film which is superior in the adhesive properties of metallized membrane and the printability and adhesive properties of metallized surface and also superior in the film-making properties and processability into film and still retains characteristics of propylene-α-olefin copolymers having superior high-impact properties and low temperature heat-sealability, and as a result, have found that when there is used a composition obtained by blending a specified polyethylene in a specified amount, with a specified propylene-α-olefin copolymer, it is possible to obtain an objective superior metallized film.

SUMMARY OF THE INVENTION

The present invention resides in:

(1) a polyolefin resin composition for metallized films obtained by blending a crystalline propylene-α-olefin copolymer containing 70% by weight or more of propylene component and having a crystalline melting point of 150° C. or lower with a high density polyethylene having a density of 0.940 g/cm$^3$ or higher in blending proportions of 96 to 80% by weight of said copolymer and 4 to 20% by weight of said polyethylene, the ratio of the melt flow rate (MI) of said polyethylene to the melt flow rate (MFR) of said copolymer being equal to or larger than 0.7;

(2) a polyolefin resin composition according to the above item (1) containing as an additive, a phenolic antioxidant and/or phosphoric antioxidant, each having a molecular weight of 500 or more, in an amount of 0.01 to 0.30% by weight based on said composition;

(3) a polyolefin resin composition according to the above item (1) containing an inorganic filler in an amount of 0.0 to 1.0% by weight based on said composition; and (4) a polyolefin resin composition according to the above item (3) wherein said inorganic filler is a metal-substituted type zeolite having a particle size of 5μ or smaller and its content in said composition is 0.01 to 0.4% by weight.

DESCRIPTION OF THE PREFERRED EMBODIMENTS

The crystalline propylene-α-olefin random copolymer used in the present invention contains 70% by weight or more of propylene component and has a crystalline melting point (hereinafter abbreviated to Tm) of 150° C. or lower. If the content of the propylene component in the copolymer is less than 70% by weight, the resulting film has a low rigidity and is liable to cause blocking to thereby make the taken-up figure inferior. If the Tm exceeds 150° C., the low temperature heat-sealability and the high speed sealability are notably reduced.

The crystalline melting point (Tm) referred to herein means the peak temperature of an endothermic curve accompanying the crystal fusion obtained by raising the temperature of 10 mg of a sample at a rate of 10° C./min. in nitrogen atmosphere by means of a differential scanning calorimeter. In the case of crystalline propylene-α-olefin copolymers, if the content of comonomer increases, the Tm lowers, and in the case of propylene-ethylene random copolymers, if the content of ethylene component in the copolymer exceeds 2.5% by weight, the Tm is 150° C. or lower although it varies to a certain extent depending on the extent to which of the copolymer is a random copolymer. In addition, block-copolymerized polymers such as ethylene-block copolymers generally have a Tm of 150° C. or higher (besides this Tm, a small peak as a sub-peak appears in the vicinity of 128° C.), and films obtained therefrom are inferior in the low temperature heat sealability and high speed heat sealability to make it impossible to use them for the present invention.

The above-mentioned crystalline propylene-α-olefin random copolymer can be obtained by subjecting propylene as a main component and ethylene or an α-olefin of 4 to 8 carbon atoms as a comonomer to random copolymerization according to a known method e.g. by the use of a Ziegler-Natta catalyst. Examples of such copolymers are ethylene-propylene copolymer, propylenebutene-1 copolymer, ethylene-propylene-butene-1 copolymer, etc.

The high density polyethylene having a density of 0.940 g/cm$^3$ also includes copolymers of ethylene as a main component with other α-olefins. If the density of the high density polyethylene is lower than 0.940, it is impossible to obtain metallized films having a good taken-up figure, as desired in the present invention.

The crystalline propylene-α-olefin random copolymer and the high density polyethylene used in the present invention must have a ratio of the melt index (MI) of the polyethylene to that (MFR) of the copolymer of 0.7 or higher, that is, MI/MFR≧0.7, and their blending proportions must be in the range of 96 to 80% by weight of the copolymer and 4 to 20% by weight of the polyethylene. If the ratio of MI to MFR is lower than 0.7, numberless projections and depressions in the form of fish eyes are formed on the film to make it impossible to obtain a smooth metallized film. Whereas if the ratio is within a range of 0.7 to 1.2, a metallized film having a delustered tone can be obtained, and if the ratio is 1.3 or larger, a metallized film having a metallic luster can be obtained. Further, from the viewpoint of the taken-up figures of the raw film as well as the metallized film, it is most desirable that the ratio is in the range of 1.1 to 8.0. In addition, the MI of the high density polyethylene and the MFR of the crystalline propylene-α-olefin random copolymer referred to herein mean the melt flow rate according to the polyethylene testing method of JIS K6760 (190° C., 2.16 Kg f), and the melt flow rate according to the polypropylene testing method of JIS K6758 (230° C., 2.16 Kg f), respectively.

The reason that the blending proportions of the copolymer and the polyethylene used in the present invention are made 96 to 80% by weight of the copolymer and 4 to 20% by weight of the polyethylene, is that if the blending proportion of the polyethylene is less than 4% by weight, a good taken-up figure cannot be obtained, while if it exceeds 20% by weight, crepe-like wrinkles are formed due to crystallization of the polyethylene at the time of film making to make it impossible to obtain a good film.

In order to retain the adhesion strength of the metallized membrane as well as the printability and adhesive properties of the metallized surface, desired in the present invention, the composition consisting of the copolymer and the polyethylene used in the present invention is preferred to contain substantially no fatty acid derivative such as higher fatty acid salts, fatty acid amides, etc. which have so far been conventionally used.

Examples of additives capable of being added to the composition used in the present invention are phenolic antioxidants having a molecular weight of 500 or more, phosphoric antioxidants having a molecular weight of 500 or more, inorganic fillers and other kinds of polymers free from fatty acid derivatives. Examples of antioxidants having a molecular weight of 500 or more are tetrakis-[methylene-3-(3′,5′-di-t-butyl-4′-hydroxyphenyl)propionate]methane, 1,3,5-trimethyl-2,4,6-tris(3,5-di-t-butyl-4-hydroxybenzyl)benzene, 1,3,5-tris(4-t-butyl-3-hydroxy-2,6-dimethyl-benzyl)isocyanurate, 6-(4-hydroxy-3,5-di-t-butylamino)-2,4-bis-n-octylthio-1,3,5-triazine, 1,1,3-tris(2-methyl-4-hydroxy-5-t-butylphenyl)-butane, tris(3,5-di-t-butyl-4-hydroxyphenyl)isocyanurate, tetrakis(2,4-di-t-butylphenyl)4,4′-biphenylenediphosphinite, etc. These antioxidants are added singly or in combination of two or more kinds in an amount of 0.01 to 0.30% by weight, preferably 0.05 to 0.20% by weight, based on the total weight of the resins. The addition of these antioxidants are effective for the stability of the composition at the time of film making and the prevention of the polyethylene from gelling. Those having a molecular weight less than 500 are undesirable since they are generally liable to migrate or volatilize. Further if the amount added exceeds 0.30% by weight, the printability of the metallized surface lowers, while if it is less than 0.01%, the capability of preventing oxidation is insufficient and film-making is difficult.

As the inorganic fillers, any of calcium carbonate, silica, clay, talc, mica, etc. may be blended, but, in order to neutralize the acidic substances contained in the polymers, metal-substituted zeolites having an average particle size of 5 microns or less and also a small secondary cohesiveness are preferably used. As the metal-substituted zeolites, there are those obtained by exchanging metal ions of group II of the Periodic Table such as Mg or Ca for Na or K ions contained in natural or synthetic zeolites, and among them, Ca-substituted type zeolite is most desirable.

Further, examples of the above other kinds of polymers are maleic acid-grafted polypropylene for more strengthening the adhesion between film and metallized membrane, low density polyethylene, ethylene-α-olefin rubbers for more improving the high-impact properties, etc., but fatty acid derivatives must not be blended in these other kinds of polymers to an extent that the object of the present invention is damaged.

In order to sufficiently exhibit the effectiveness of the present invention, the amount of the above inorganic fillers and other kinds of polymers to be blended into the composition used in the present invention is preferred to be 10% by weight or less.

As for the blending manner for obtaining the composition used in the present invention, any of conventional means such as Henschel mixer, Banbury mixer, various kneaders, extruder, etc. may be used. Further, the copolymer and the polyethylene may be separately pelletized and blended at the time of film making.

As for the film making process from the composition, either of known T-die process or tubular process may be employed, but films must be made under such a condition that the melt-extruded composition is quenched down to 70° C. or lower, like the conventional condition of polypropylene film making. If it is cooled at a temperature higher than 70° C., the resulting film is notably brittle and also the low temperature sealability becomes inferior.

The thus obtained film is subjected to corona discharge treatment onto the surface to be metallized, followed by metallizing in vacuo to obtain an objective metallized polyolefin film. This corona discharge treatment may be carried out at an appropriate time after the polyolefin film making and till metallizing, but it is simplest to carry out the treatment between film making and film take-up.

Unless corona discharge treatment is carried out, adhesive force of :netals onto the film at the time of metallizing is insufficient to make it impossible to apply the resulting product to practical use. As for the degree of the corona discharge treatment, it is preferred to carry out the treatment so as to give a wetting index of 37 dyn/cm or more, particularly in the range of 39 to 43 dyn/cm, as measured according to JIS K6768. In addition, in order to increase the adhesion between film and metals, such a means has been employed that a substance having a good affinity to the metal such as polyester, polyurethane, epoxy resin, etc. is coated onto the surface of the film to be subjected to corona discharge treatment, followed by metallizing, and in the case of metallizing of the present invention, the above means, of course, may be employed simultaneously with the metallizing.

As for the process of vacuum-metallizing the film comprising the composition of the present invention, any of known processes may be employed, but generally such a process is employed that in a vacuum metallizing apparatus provided with a delivery part, a metallizing part and a take-up part of film, and reducing the atmospheric pressure inside the apparatus down to $10^{-4}$ Torr or less by simultaneously employing an oil pump and a diffusion pump, a vessel containing a desired metal such as aluminum or filaments having a desired metal attached thereto is heated to melt and vaporize the metal and then the vaporized molecules of the metal are continuously deposited onto the surface of the delivered film, followed by take-up. In addition, the thickness of the metallized layer is usually in the range of 0.01 to several microns.

Thus, as for the film to be subjected to vacuum-metallizing, the longer the taken-up length of the film is and the broader its width is, the more its productivity is improved; thus a tendency to a large scale is observed. In this case, the commodity value depends greatly on the taken-up figure of the delivered film and that of the taken-up film after the metallizing. In this respect, the film comprising the composition of the present invention brings about good results; hence its great contribution can be expected to lead to improvement in the productivity of metallized polyolefin film as well as broadening of its use applications, in addition to its superior metallizing properties and printability and adhesive properties of the metallized surface.

The present invention will be concretely illustrated by way of the following Examples and Comparative examples. In addition, the measurements of the physical properties in these examples were carried out according to the following methods:

(1) Rigidity: According to ASTM D882 (1% secant modulus ($Kg/cm^2$)).

(2) Blocking degree: Two sample pieces of 2 cm wide and 10 cm long are superposed by a length of 2 cm, and in the case of raw film, surfaces subjected to corona discharge treatment are superposed on one another and in the case of metallized film, non-metallized surfaces are superposed on one another; a weight of 2 Kg having a bottom surface of 2 cm × 2 cm is placed on the superposed surfaces and in this state, they are allowed to stand in a constant temperature bath for 24 hours; and thereafter the force ($Kg/4\ cm^2$) required for shear-peeling the superposed parts was sought by means of a tensile tester.

(3) Wetting index: This was measured relative to the film surface subjected to corona discharge treatment, according to the method of JIS K6768 (dyn/cm).

(4) Taken-up figure of film: A film roll obtained by continuously taking up a definite length of raw film or metallized film was observed with naked eyes, and those free from wrinkle or enlarged part (take-up protuberance) were evaluated as o (good taken-up figure) and those containing wrinkles or enlarged parts were evaluated as × (bad taken-up figure).

(5) Adhesive properties of metallized membrane: A cellophane tape (Sekisui Cellotape ® manufactured by Sekisui Kagaku) of 18 mm wide was applied onto the metallized film on the side of the metallized membrane over a length of 70 mm; thereafter the tape was rapidly peeled off; and the percentage of the area of the metallized membrane remaining on the surface of the sample film without being attached onto the adhesive tape was sought to carry out the following ranking:

| Percentage of remaining area (%) | Rank |
| --- | --- |
| 90~100 | 3 |
| 70~89 | 2 |

-continued

| Percentage of remaining area (%) | Rank |
| --- | --- |
| less than 70 | 1 |

(6) Suitability of metallized surface to printing and laminate: The metallized surface (metal surface) of a film metallized on its one surface was superposed on the non-metallized surface of the film and they were allowed to stand under a load of 1 Kg/100 cm$^2$ applied thereto in an atmosphere of a relative humidity of 95% at a temperature of 40° C., for 72 hours, followed by measuring the wetting index (dyn/cm) of the metallized surface. A wetting index of 35 or more is required for the film to be evaluated as having a good suitability thereof to printing and laminate.

COMPARATIVE EXAMPLES 1-7

Tetrakis[methylene-3-(2',5'-di-t-butyl-4'-hydroxyphenyl)propionate]methane as an antioxidant (0.10 % by weight) and various additives shown in Table 1 were blended with an ethylene-propylene random copolymer which is a light-impact resin, consisting of 96.8% by weight of propylene component and 3.2% by weight of ethylene component, followed by kneading the resulting blends by means of an extruder at 230° C. to obtain 7 kinds of pelletized compositions, which were then respectively made into films by means of an extruder having a bore diameter of 75 mm and a T-die, at a melting temperature of 230° C. and a chill roll temperature of 30° C., just thereafter subjecting the respective films to corona discharge treatment on one surface thereof and taking up them to obtain a rolled raw film of 25μ thick, 100 cm wide and 2,000 m long. Each of the raw films was then cut to a width of 60 cm by means of a slitter, followed by setting the film to a vacuum metallizing apparatus, continuously delivering the film, metallizing the film on the surface thereof subjected to corona discharge treatment, and taking up the film to obtain a rolled metallized film having a metallized membrane of 0.05 micron thick. The properties of the raw film and the metallized film are also shown in Table 1.

As apparent from Table 1, the films having fatty acid derivatives added have a good taken-up figure in both the cases of the raw film and the metallized film, but the adhesive force of the metallized membrane is inferior, and also the wetting index of the metallized surface is notably reduced. On the other hand, the films having no fatty acid derivative added are superior in the adhesive force of the metallized membrane and the wetting index of the metallized surface, but the raw film and the metallized film both have a large blocking degree and their taken-up figure is inferior. Namely, when ethylene-propylene random copolymers are used, it is impossible to obtain a desirable metallized film, irrespectively of either addition or non-addition of fatty acid derivatives.

EXAMPLES 1-4 AND COMPARATIVE EXAMPLES 8-13

Various kinds of polyethylenes in powder form shown in Table 2 were respectively blended with a powdery ethylene-propylene random copolymer consisting of 95.3% by weight of propylene component and 4.7% by weight of ethylene component and having 1,3,5-trimethyl-2,4,6-tris(3,5-di-t-butyl-4-hydroxybenzyl)benzene as an antioxidant added in an amount of 0.15% by weight and also having a MFR of 4.5 and a Tm of 142° C., followed by preparing pelleted compositions in the same manner as in Comparative examples 1-7, from which compositions raw films and metallized films were obtained. The properties of the thus obtained raw films and metallized films are also shown in Table 2. In addition, in the case of the raw films of Comparative examples 10-12, crepe-like wrinkles and fish-eyes were formed so that the smoothness of the film surface was bad; hence no metallizing test was carried out.

As apparent from Table 2, it is possible to obtain raw films and metallized films both having various much superior characteristics, from the compositions within the scope of the present invention, whereas only those having a large blocking degree and a bad taken-up figure are obtained from compositions outside the scope of the present invention.

TABLE 1

| | | | Raw film | | Metallized film | | | |
| --- | --- | --- | --- | --- | --- | --- | --- | --- |
| | Additive | (%) | Blocking degree (g/4 cm$^2$) | Taken-up figure | Adhesive properties of metallized surface | Wetting index of film surface (dyn/cm) | Wetting index of metallized surface (dyn/cm) | Taken-up figure |
| Compar. ex. 1 | Calcium stearate Oleic acid amide Silica (average particle size: 2μ) | 0.10 0.10 0.10 | 110 | o | 1 | 70 | <30 | o |
| Compar. ex. 2 | Calcium stearate Ethylenebis-stearamide Silica (average particle size: 2μ) | 0.10 0.10 0.10 | 90 | o | 1 | 60 | <30 | o |
| Compar. ex. 3 | Calcium stearate Silica (average particle size: 2μ) | 0.15 0.10 | 85 | o | 1 | 60 | <30 | o |
| Compar. ex. 4 | Glycerine monostearate Silica (average particle size: 2μ) | 0.20 0.25 | 210 | o | 1 | 140 | <30 | o |
| Compar. ex. 5 | Calcium stearate | 0.03 | 970 | x (wrinkle) | 2 | 710 | 31 | x (enlarged) |
| Compar. ex. 6 | Silica (average particle size: 2μ) | 0.25 | 730 | x (enlarged) | 3 | 420 | 40 | x (enlarged) |
| Compar. | | 0.00 | 1260 | x | 3 | 930 | 41 | x |

TABLE 1-continued

|  |  | Raw film | | Metallized film | | | |
|---|---|---|---|---|---|---|---|
| Additive | (%) | Blocking degree (g/4 cm²) | Taken-up figure | Adhesive properties of metallized surface | Wetting index of film surface (dyn/cm) | Wetting index of metallized surface (dyn/cm) | Taken-up figure |
| ex. 7 | | (enlarged) | | | | | (enlarged) |

TABLE 2

| | Polyethylene | | | Raw film | | | | | Metallized film | | |
|---|---|---|---|---|---|---|---|---|---|---|---|
| | Density (g/cm³) | MI (g/10 min) | Amount added (%) | Rigidity (Kg/cm²) | Wetting index (dyn/cm) | Blocking degree (g/4 cm²) | Taken-up figure | Note | Adhesive properties | Wetting index of metal surface (dyn/cm) | Taken-up figure |
| Comp. ex. 8 | — | — | 0 | 4,400 | 40 | 1,470 | x (Wrinkle) | | 3 | 42 | x (Enlarged) |
| Comp. ex. 9 | 0.960 | 8.0 | 2 | 4,700 | 39 | 1,110 | x (Enlarged) | | 3 | 43 | x (Enlarged) |
| Ex. 1 | 0.960 | 8.0 | 4 | 5,400 | 39 | 420 | o | | 3 | 43 | o |
| Ex. 2 | 0.960 | 8.0 | 7 | 6,100 | 39 | 230 | o | | 3 | 43 | o |
| Ex. 3 | 0.960 | 8.0 | 15 | 6,600 | 39 | 70 | o | | 3 | 43 | o |
| Comp. ex. 10 | 0.960 | 8.0 | 25 | 7,100 | 39 | 60 | x | Many crepe-like wrinkles were formed | — | — | — |
| Ex. 4 | 0.957 | 4.0 | 4 | 5,300 | 40 | 340 | o | | 3 | 42 | o |
| Comp. ex. 11 | 0.958 | 2.5 | 4 | 5,300 | 39 | 210 | x | Many fish-eyes were formed | — | — | — |
| Comp. ex. 12 | 0.952 | 0.3 | 4 | 5,100 | 39 | 230 | x | Fish-eyes were formed on the total surface | — | — | — |
| Comp. ex. 13 | 0.952 | 8.0 | 4 | 4,200 | 38 | 1,520 | x (Wrinkle) | | 3 | 40 | x (Enlarged) |

EXAMPLE 5 AND COMPARATIVE EXAMPLE 14

A pelletized ethylene-propylene-butene-1 terpolymer (A) (94% by weight) consisting of 92.5% by weight of propylene component, 4.0% by weight of ethylene component and 3.5% by weight of butene-1 component, and containing tetrakis(2,4-di-t-butylphenyl)4,4'-biphenylene-diphosphinite as an antioxidant (0.10% by weight) and also having a MFR of 5.5 and a Tm of 138° C. was preliminarily blended with a high density polyethylene (B) (6% by weight) containing 1,3,5-trimethyl-2,4,6-tris(3,5-di-t-butyl-4-hydroxybenzyl)benzene as an antioxidant (0.07% by weight) and a calcium-substituted type zeolite having an average particle size of 2μ, as a neutralizing agent (0.10% by weight), and also having a density of 0.962 and a MI of 10.8, by means of a tumbler mixer, followed by making the blend into a film by means of an extruder having a bore diameter of 115 mm and a T-die at a melting temperature of 240° C. and a chill roll temperature of 20° C., subjecting the film to corona discharge treatment on one surface thereof and taking up the film, to obtain a rolled raw film of 20μ thick, 220 cm wide and 6,000 m long, which was then cut to a width of 100 cm by means of a slitter, followed by the same procedure as in Comparative examples 1–7, to obtain a rolled, aluminum-metallized film having a total length of 6,000 m. The properties of the raw film and the metallized film were as follows:

| Raw film | |
|---|---|
| Rigidity | 5,400 Kg/cm² |
| Blocking degree | 160 g/4 cm² |
| Wetting index | 40 dyne/cm |
| Taken-up figure | o |

| Metallized film | |
|---|---|
| Adhesive properties of metallized membrane | 3 |
| Wetting index of metallized surface | 41 dyn/cm |
| Take-up figure | o |

For comparison, a film was made from the above mentioned pelletied terpolymer (A) alone, and as a result, wrinkles were formed on the taken-up film; the end part of the film roll was enlarged; and the taken-up length was restricted to about several hundred meters.

What we claim is:

1. In the process of subjecting a resin film base to corona discharge treatment and then metallizing in vacuo, the improvement which comprises using a resin film consisting of a blend of
   (a) crystalline propylene-alpha-olefin copolymer,
      (i) containing at least 70% by weight of propylene, and
      (ii) having a crystalline melting point of lower than 150° C. with
   (b) a high density polyethylene having a density of at least 0.940 g/cm³,
   (c) said blend containing 96–80% by weight of said copolymer and 4–20% by weight of said polyethylene,
   (d) the ratio of the melt flow rate of said polyethylene to the melt flow rate of said copolymer being at least 0.7, and
   at least one additive selected from the group consisting of phenolic antioxidants and phosphoric antioxidants having a molecular weight of 500 or more and being present in an amount of 0.01 to 0.30% by weight based on the weight of the entire composition.

2. A metallized polyolefin resin film wherein the polyolefin resin film is a polymeric blend consisting of:
(a) a crystalline propylene-alpha-olefin copolymer
  (i) containing at least 70% by weight of propylene, and
  (ii) having a crystalline melting point of lower than 150° C. with
(b) a high density polyethylene having a density of at least 0.940 g/cm$^3$,
(c) said blend containing 96–80% by weight of said copolymer and 4–20% by weight of said polyethylene,
(d) the ratio of the melt flow rate of said polyethylene to the melt flow rate of said copolymer being at least 0.7, and
at least one additive selected from the group consisting of phenolic antioxidants and phosphoric antioxidants having a molecular weight of 500 or more and being present in an amount of 0.01 to 0.30% by weight based on theveight of the entire composition.

* * * * *